(12) United States Patent
Bolton et al.

(10) Patent No.: US 8,880,770 B2
(45) Date of Patent: Nov. 4, 2014

(54) PROTOCOL TRANSLATING ADAPTER

(75) Inventors: Lawrence G. Bolton, Urbana, IL (US); Robert J. Walsh, Sunnyvale, CA (US); Scott Krueger, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 13/491,470

(22) Filed: Jun. 7, 2012

(65) Prior Publication Data

US 2013/0332635 A1      Dec. 12, 2013

(51) Int. Cl.
*G06F 13/36*        (2006.01)
*G06F 3/00*         (2006.01)

(52) U.S. Cl.
USPC .................. 710/315; 710/8; 710/11; 710/14

(58) Field of Classification Search
None
See application file for complete search history.

(56) References Cited

U.S. PATENT DOCUMENTS

| | | | |
|---|---|---|---|
| 6,680,952 B1 | 1/2004 | Berg et al. | |
| 6,877,023 B1 | 4/2005 | Maffeis et al. | |
| 7,127,517 B2 | 10/2006 | Heisig et al. | |
| 2004/0224638 A1* | 11/2004 | Fadell et al. | 455/66.1 |
| 2006/0156415 A1* | 7/2006 | Rubinstein et al. | 726/27 |
| 2008/0273486 A1 | 11/2008 | Pratt et al. | |
| 2008/0320190 A1 | 12/2008 | Lydon et al. | |
| 2010/0106268 A1* | 4/2010 | Howarter et al. | 700/94 |
| 2010/0121986 A1 | 5/2010 | Blanton et al. | |
| 2010/0169808 A1* | 7/2010 | Yu et al. | 715/764 |
| 2011/0171903 A1 | 7/2011 | Toebes | |
| 2012/0028583 A1 | 2/2012 | Dorogusker et al. | |

OTHER PUBLICATIONS

International Search Report and Written Opinion mailed Sep. 24, 2013 in PCT Application No. PCT/US2013/040668, 9 pages.

* cited by examiner

*Primary Examiner* — Idriss N Alrobaye
*Assistant Examiner* — David Martinez
(74) *Attorney, Agent, or Firm* — Kilpatrick Townsend & Stockton LLP

(57) ABSTRACT

An adapter facilitates communications between an accessory and a media source. When the adapter is connected to the accessory, the adapter can receive a connection request from the media source. Based on the connection request, the adapter can determine whether the media source supports an accessory protocol. The adapter can receive streamed media from the media source. When a control message is received by the adapter from the accessory, if the adapter determined that the media source supports the accessory protocol, the adapter transmits the control message to the media source using the accessory protocol. If the adapter determined that the media source does not support the accessory protocol, the adapter translates the control message and transmits the translated message to the media source.

24 Claims, 7 Drawing Sheets

PROTOCOL TRANSLATING ADAPTER

BACKGROUND

Many accessories are available to receive streaming media, such as audio tracks, video tracks, and still photos from media source devices. These accessories range in complexity, including, for example, simple speaker systems and complex home entertainment systems. A wide variety of media source devices are capable of generating streaming media, such as portable media players, smart phones, tablet computers, laptop computers, and desktop computers.

An accessory may receive streamed media from a media source device using a connector having a particular format. For example, an accessory may have a dock connector that fits with a receptacle connector of a media source device such that a physical and electrical connection is made between the contacts of the respective connectors. An accessory that is compatible with a particular media source device may have a connector that is not compatible with another media source device. An accessory may communicate using an accessory protocol that is supported by some media source devices but not supported by other media source devices.

BRIEF SUMMARY

Embodiments of the present invention provide circuits, methods, and apparatus that provide compatibility among accessories and media source devices. An exemplary embodiment provides an adapter that can be connected to an accessory. To facilitate communication between the accessory and a media source, the adapter can interpret a connection request received from the media source to determine if the media source supports an accessory protocol. For example, information elements in the connection request can indicate whether the accessory protocol is supported by the media source. The adapter can stream media content from the media source to the accessory according to a wireless streaming protocol. The accessory may issue a control message using an accessory protocol. Depending on whether the media source supports the accessory protocol, the adapter can determine whether to translate the control message before transmitting the control message to the media source. If the media source supports the accessory protocol, the adapter sends the control message to the media source without translating the control message. If the media source does not support the accessory protocol, the adapter can translate the control message into the wireless streaming protocol before transmitting the control message.

In certain embodiments, the adapter broadcasts the presence of the accessory to the media source via a wireless channel. In response to receiving a connection request from the media source, the adapter can initiate a channel for streaming media from the media source to the accessory. The adapter can determine whether the media source supports an accessory protocol based on information elements of the connection request. If the media source supports the accessory protocol, the adapter can initiate a first mode in which control messages received from the accessory using the accessory protocol are transmitted to the media source using the accessory protocol. If the media source does not support the accessory protocol, the adapter can initiate a second mode in which control messages from the accessory are translated from the accessory protocol into a wireless streaming protocol. The adapter transmits the translated control messages to the media source.

Another aspect of the present invention relates to an adapter for connecting an accessory with a media source. The adapter can include a first communication interface adapted to connect the adapter with an accessory, a second communication interface adapted to receive streamed media from the media source, and adapter circuitry adapted to deliver the streamed media received from the first communication interface to the second communication interface. The adapter can also include a protocol translation module. The protocol translation can determine whether the media source supports an accessory protocol based on one or more information elements of a connection request received by the adapter. If the media source supports the accessory protocol, the protocol translation module can transmit the control message from the accessory to the media source using the accessory protocol. If the media source does not support the accessory protocol, the protocol translation module can translate the control message into the wireless streaming protocol and transmit the translated control message to the media source.

To better understand the nature and advantages of the present invention, reference should be made to the following description and the accompanying figures. It is to be understood, however, that each of the figures is provided for the purpose of illustration only and is not intended as a definition of the limits of the scope of the present invention.

DETAILED DESCRIPTION

Figure 1:
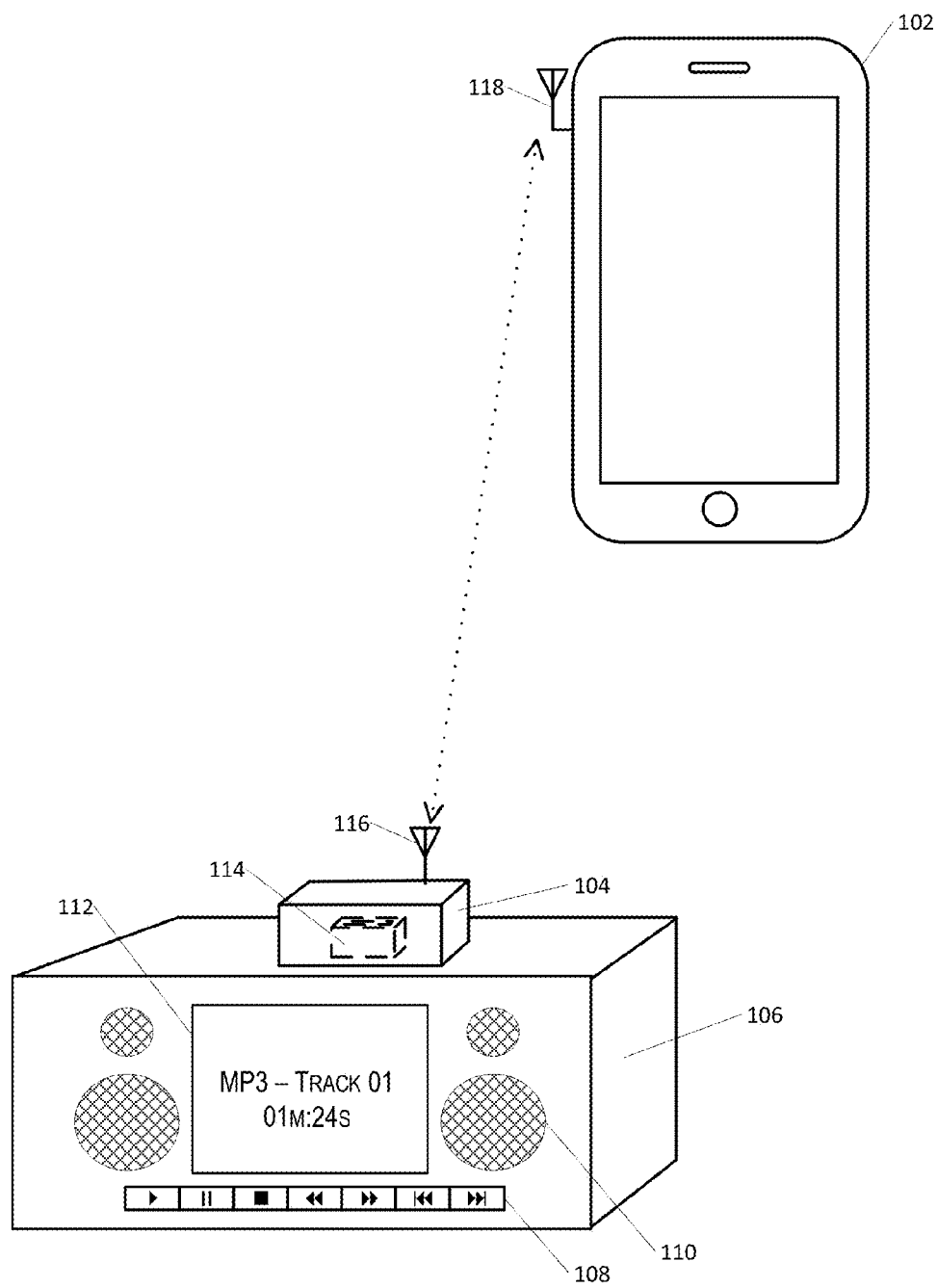
FIG. 1 illustrates an adapter connected to an accessory and to a media source according to an embodiment of the present invention.

Embodiments of the present invention relate to an adapter that facilitates interoperation between an accessory and various media source devices. The adapter provides communication connections with an accessory and a media source device to allow the accessory to receive streamed media from the media source.

A media source can stream media content to the adapter using a wireless streaming protocol. The adapter can provide the media to the accessory. The adapter can also receive control messages (e.g., play, pause, track selection, etc.) from the accessory. The control messages can conform to an accessory protocol that is different from the wireless streaming protocol and the adapter can send corresponding control signals to the media source. For example, the adapter can determine whether the media source supports the accessory protocol. If so, the adapter can relay the received control messages to the media source; if not, the adapter can translate the received control message to a protocol that is supported by the media source, such as the wireless streaming protocol.

An accessory may be designed to interoperate with a media source having a particular connector format. For example, a media source that is a portable media device may have a particular connector format. If a connector format change occurs when a new model of the portable media device is released, the accessory may be rendered incompatible with the new model of the portable device. It may be desirable to use the accessory with portable media devices or other media sources lacking a connector that is compatible with the connector of the accessory. For example, a user of the accessory may wish to stream media from a personal computer to the accessory.

An adapter according to embodiments of the invention has a first communication interface to connect to an accessory and a second communication interface, such as a wireless communication interface, to connect to a media source. By using an interface such as a wireless communication interface to connect to a media source, the adapter may facilitate interoperation between an accessory and a variety of media sources. For example, the adapter may facilitate interoperation between an accessory and media sources lacking a connector that mates with the connector of the accessory.

The accessory may use a protocol such as an accessory protocol to interoperate with a media source. If a media source does not support the accessory protocol, errors may result from commands using the accessory protocol. The media source may support a wireless streaming protocol. An adapter according to embodiments of the invention may determine whether a media source supports an accessory protocol. If the adapter does not support the accessory protocol, the adapter may translate messages, such as control messages issued by the accessory, from an accessory protocol to a wireless streaming protocol.

According to some embodiments, the adapter may broadcast the presence of the accessory via a wireless channel. The media source may be enabled to detect the broadcast indicating the presence of the accessory. A route picker interface presented on a display of the media source may allow a user to select an indicator associated with the accessory. In response to the user selection, the media source may send a connection request to the adapter. The adapter may determine whether the media source supports an accessory protocol and begin receiving streamed media content from the media source without any further user interaction. In this manner, the user is provided with a simple procedure for configuring a media source to interoperate with the accessory.

The adapter, accessory, and media source are described further below with reference to FIG. 1.

FIG. 1 illustrates an adapter 104 communicatively connected to an accessory 106 and a media source 102 according to an embodiment of the present invention.

Accessory 106 can be any device capable of receiving streamed media from a media source, such as a speaker, display unit, a combined speaker and display unit, a head unit, and so on. The accessory can also include a user interface that can include input and output controls, such as exemplary playback controls 108, speaker 110 and display 112.

Media source 102 can be any device capable of transmitting media files as streamed media. A media source can be a portable electronic device, such as a portable media device (e.g., iPod®, iPhone®, or iPad®), or another computing device (e.g., a desktop or laptop computer).

Adapter 104 communicates with accessory 106 using a first communication interface. In some embodiments, the first communication interface is an electrical connector interface. In an illustrative example, the accessory may have a dock connector such as a 30-pin dock connector, and the adapter may include a receptacle connector formatted to mate with the dock connector of the accessory. Adapter 104 is shown with exemplary receptacle connector 114 in accordance with an embodiment of the invention.

Communications between the adapter and a media source can occur via a second communication interface. The second communication interface can be a wireless communication interface. For example, the adapter and the media source can each include RF transceiver components coupled to an antenna to support wireless communications. In an illustrative embodiment, antenna 116 of adapter 104 transmits wireless communications to and receives wireless communications from antenna 118 of media source 102.

Adapter 104 can be configured to be capable of connecting to media sources that lack a connector configured to mate with a connector of accessory 106. For example, adapter 104 can communicate wirelessly with media source 102. This allows the adapter to facilitate connection between the accessory and a wide range of media sources.

Figure 2:
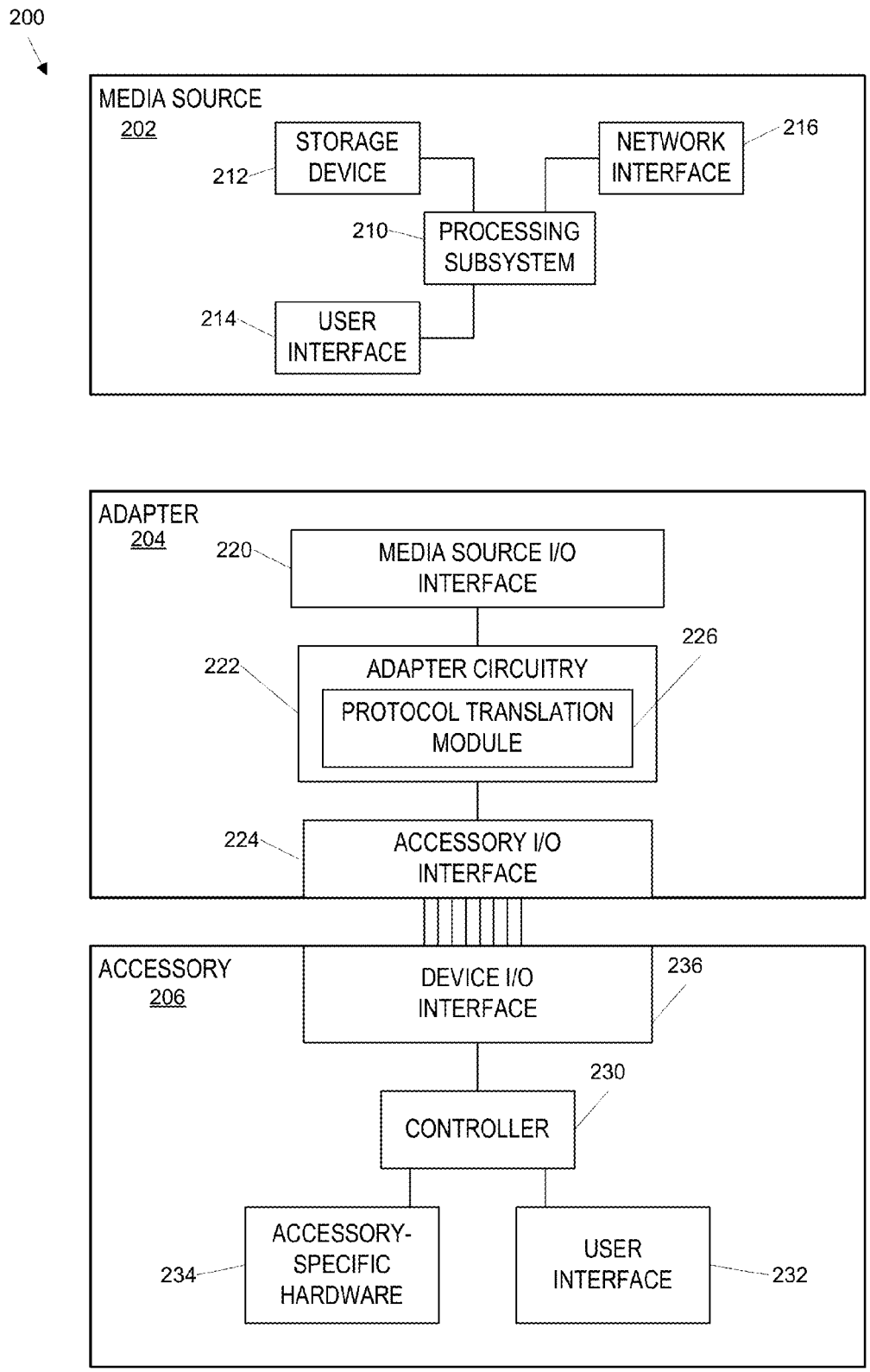
FIG. 2 is a block diagram of a system including an accessory, an adapter, and a media source according to an embodiment of the present invention.

FIG. 2 is a block diagram of a system 200, which can be, e.g., an implementation of the devices shown in FIG. 1. System 200 includes media source 202, adapter 204, and accessory 206 according to an embodiment of the present invention. In this embodiment, media source 202 (e.g., implementing media source device 102 of FIG. 1) can provide computing, communication and/or media playback capability. Media source 202 can include processing subsystem 210, storage device 212, user interface 214, and network interface 216. Media source 202 can also include other components (not explicitly shown) such as a battery, power controllers, and other components operable to provide various enhanced capabilities.

Storage device 212 can be implemented, e.g., using disk, flash memory, or any other non-transitory storage medium, or a combination of media, and can include volatile and/or non-volatile media. In some embodiments, storage device 212 can store data objects such as audio files, video files, image or artwork files, information about a user's contacts (names, addresses, phone numbers, etc.), information about a user's scheduled appointments and events, notes, and/or other types of information. In some embodiments, storage device 212 can also store one or more application programs to be executed by processing subsystem 210 (e.g., video game programs, personal information management programs, media playback programs, etc.).

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of media source 202 and can view and/or hear output from media source 202 via output devices of user interface 214.

Processing subsystem 210 can be implemented as one or more integrated circuits, e.g., one or more single-core or multi-core microprocessors or microcontrollers, examples of which are known in the art. In operation, processing subsystem 210 can control the operation of media source 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage device 212.

Through suitable programming, processing subsystem 210 can provide various functionality for media source 202. Processing subsystem 210 can also execute other programs to control other functions of media source 202, including application programs that can be stored in storage device 212.

Network interface 216 can provide voice and/or data communication capability for portable device 202. In some embodiments network interface 216 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof), components for short-range wireless networking (e.g., using Bluetooth standards), GPS receiver components, and/or other components. In some embodiments network interface 216 can provide wired network connectivity (e.g., Ethernet) in addition to or instead of a wireless interface. Network interface 216 can be implemented using a combination of hardware (e.g., driver circuits, antennas, modulators/demodulators, encoders/decoders, and other analog and/or digital signal processing circuits) and software components.

Adapter 204 (e.g., implementing adapter 104 of FIG. 1) can include media source I/O interface 220, adapter circuitry 222 and accessory I/O interface 224.

Media source I/O interface 220 can allow adapter 204 to communicate with various media sources. For example, media source I/O interface 220 can include RF transceiver components to support wireless communication (e.g., via Wi-Fi, Bluetooth, or other wireless protocols) and wireless data networks (e.g., using advanced data network technology such as Wi-Fi (IEEE 802.11 family standards)).

Accessory I/O interface 224 of adapter 204 can support connections to accessories such as a speaker dock or media playback station, a radio tuner, an in-vehicle entertainment system or head unit, an external video device, and so on. Accessory I/O interface 224 can include a connector that mates directly with a connector included in device I/O interface 236 of accessory 206. In some embodiments, device I/O interface 236 can include a connector complementary to the connectors used in various iPod®, iPhone®, and iPad® devices, as well as supporting circuitry. The connector can provide connections for power and ground as well as for one or more data communication interfaces such as Universal Serial Bus (USB), FireWire (IEEE 1394 standard), and/or universal asynchronous receiver/transmitter (UART). In some embodiments, the connector provides dedicated power and ground contacts, as well as some number of programmable digital data contacts that can be used to implement different communication technologies in parallel; for instance, two pins can be assigned as USB data pins (D+ and D−) and two other pins can be assigned as serial transmit/receive pins (e.g., implementing a UART interface); the assignment of pins to particular communication technologies can be negotiated while the connection is being established. In some embodiments, the connector can also provide connections for audio and/or video signals, which can be transmitted to accessory 206 in analog and/or digital formats. Thus, accessory I/O interface 224 can support multiple communication channels, and a given accessory can use any or all of these channels.

Adapter circuitry 222 can provide various functionality for adapter 204. Adapter circuitry 222 may include, for example, a printed circuit board (PCB). One or more integrated circuits (ICs), such as Application Specific Integrated Circuit (ASIC) chips, can be operatively coupled to the PCB to provide information regarding media source I/O interface 220, accessory I/O interface 224, and/or to perform specific functions, such as streaming media received at media source I/O interface 220 to accessory I/O interface 224, determining protocol support, performing translation, and broadcasting presence information. In some embodiments, adapter circuitry 222 is capable of performing authentication, identification, contact configuration, and current or power regulation.

In one embodiment a protocol translation module 226 is embodied within adapter circuitry 222. For example, protocol translation module 226 may be embodiment within an IC operatively coupled to the contacts of adapter 204. Protocol translation module 226 can be programmed with information about protocols such as an accessory protocol and a wireless streaming protocol. When a connection request is received from media source 202, protocol translation module 226 can receive information associated with the connection request. Based on the information associated with the connection request from media source 202, protocol translation module 226 can determine whether media source 202 supports an accessory protocol in addition to the wireless streaming protocol. If media source 202 supports the accessory protocol, protocol translation module 226 can transmit control messages received from accessory 206 to media source 202. If media source 202 does not support the accessory protocol, protocol translation module 226 can translate control messages received from accessory 206 and transmit the translated control messages to media source 202.

In some embodiments, adapter 204 can receive identifying information from accessory 206 and broadcast a signal with information identifying accessory 206 to the media source 202. In another example, identification and configuration information from media source 202 can be communicated to adapter 204, for example, in a connection request transmitted from media source 202 and received by adapter 204. These functions can be implemented within one or more ICs of adapter 204.

Accessory 206 can be any electronic apparatus that interacts with adapter 204. Accessory 206 (e.g., implementing accessory 106 of FIG. 1) can include controller 230, user interface device 232, other accessory-specific hardware 234, and device I/O interface 236. Accessory 206 is representative of a broad class of accessories that can vary widely in capability, complexity, and form factor.

Controller 230 can include, e.g., one or more single-core or multi-core microprocessors and/or microcontrollers executing program code to perform various functions associated with accessory 206. For example, where accessory 206 incorporates a user-operable control (e.g., user-operable controls 108 of FIG. 1), controller 230 can interpret user operation of the control and responsively invoke functionality of accessory 202; in some instances, the invoked functionality can include sending information to and/or receiving information from adapter 204.

User interface 232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 206, a user can operate input devices of user interface 232 (e.g., user-operable controls 108 of FIG. 1) to invoke functionality of accessory 202.

Accessory-specific hardware 234 can include any other components that may be present in accessory 206 to enable its functionality. For example, in various embodiments accessory-specific hardware 234 can include one or more storage devices using fixed or removable storage media; GPS receiver; a network interface; power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 234.

Device I/O interface 236 can allow accessory 206 to communicate with adapter 204. Device I/O interface 236 may additionally allow the accessory to communicate with media source devices such as media source 202. In accordance with some embodiments of the invention, device I/O interface 236 can include a connector that mates directly with a connector included in a portable device, such as a connector complementary to the connectors used in various iPod®, iPhone®, and iPad® products. The connector of Device I/O interface 236 can be used to supply power, to send and/or receive audio and/or video signals in analog and/or digital formats, and to communicate information using one or more data communication interfaces such as USB, UART, and/or FireWire.

In some embodiments, accessory 206 can provide remote control over operations of media source 202 via adapter 204. For example, accessory 206 can provide a remote user interface that can include both input and output controls (e.g., playback controls 108 to receive user input, speakers 110 to reproduce audio received by the accessory, and a display screen 112 to display current status information obtained from media source 202). Accessory 206 in various embodiments can use an accessory protocol to control any function of a media source 202 that supports the accessory protocol.

It will be appreciated that the system configurations and components described herein are illustrative and that variations and modifications are possible. The portable device, adapter and/or accessory may have other capabilities not specifically described herein.

While connectors may be described herein as having pins, a term generally associated with conventional electronic devices having wires to connect components, it is to be understood that other signal paths (e.g., optical signaling) can be substituted.

Further, while the portable device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Connectors at the respective I/O interfaces 220 and 224 of adapter 204 allow devices to be connected with adapter 204 and subsequently disconnected from adapter 204. As used herein, a device (such as a media source or an accessory) and an adapter are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Wi-Fi.

In some embodiments, a media source and an accessory can communicate via the adapter by exchanging messages and data according to an "accessory protocol." The messages and data can be communicated, e.g., using any wired or wireless transport medium provided by the relevant interfaces.

The accessory protocol can define a "universe" of messages that can be exchanged between accessory 206 and media sources connected thereto that support the accessory protocol. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art.

In some embodiments, the messages can be logically grouped into a "general" message set and an "optional" message set. Every accessory and every media source that supports the accessory protocol can be required to support at least the general message set. This message set can include messages enabling the media source and the accessory to identify and authenticate themselves to each other and to provide information about their respective capabilities, including which (if any) of the messages in the optional set each supports. For example, the general message set can include a message the accessory can send to the portable device to list every message in the optional set that the accessory is capable of sending and every message in the optional set that the accessory is capable of receiving and acting on. The general message set can also include authentication messages that the portable device can use to verify the purported identity and capabilities of the accessory (or vice versa), and the accessory (or media source) may be blocked from invoking certain (or all) of the optional messages if the authentication is unsuccessful.

The optional message set can include messages related to various functionality that might or might not be supported in a given accessory. For example, the optional message set can include simple remote messages that allow an accessory to identify a function of the media source to be invoked, remote user interface messages that can be used to obtain information related to replicating all or part of a user interface of a media source on an accessory (thereby supporting a more advanced remote control), messages that allow a user to control a radio tuner in an accessory by operating a portable device and/or to control a radio tuner in a portable device by operating an accessory, and so on. Any combination of optional messages can be defined in an accessory protocol, and there is no requirement that a given accessory or media source support all (or even any) of the optional messages. Optional messages can include control messages from accessory 206 to media source 202. Control messages may include, for example, a message to stop, pause, or resume streaming of a media file or to stream from a particular position within a media file, as well as messages related to obtaining information about available media files and/or selecting a media file to be streamed.

In some embodiments, accessory 206 uses a control message to inform adapter 204 of a routing mode used by the accessory. For example, an accessory may be capable of receiving streamed media in one or more of a USB host mode, a USB device mode, and an audio line-out mode. The control message may include an indicator of one or more modes supported by the accessory.

Accessory 206 can receive data from media source 202 via adapter 204 according to a "wireless streaming protocol." In one example, the wireless streaming protocol can be the Air-Play® protocol; other proprietary or open protocols can be used. The wireless streaming protocol may allow streaming of data such as audio, video and images to an accessory. If a media source such as a portable media device is compatible with an accessory, data may be streamed directly to the accessory from the media source using the wireless streaming protocol. Where adapter 204 provides compatibility between media source 202 and accessory 206, data can be streamed from media source 202 to accessory 206 via adapter 204. The wireless streaming protocol can define a message format for messages, such as control messages to a media source used for controlling streaming from the media source.

A media source may support a wireless streaming protocol regardless of whether it supports an accessory protocol. Messages generated by accessory 206 according to an accessory protocol can be translated by adapter 204 into a wireless streaming protocol and transmitted to a media source that does not support the accessory protocol. The translated messages may be transmitted from adapter 204 to media source 202. For example, a control message generated by accessory 206 according to an accessory protocol may be translated by adapter 204 into a control message supported by a wireless streaming protocol. The translated control message will typically have a similar function as the control message to which translation was applied. For example, if a control message generated by accessory 206 according to the accessory protocol was a message to stop playback, the translated control message generated by adapter 204 according to the wireless streaming protocol would typically be a message to stop playback.

Figure 3A:
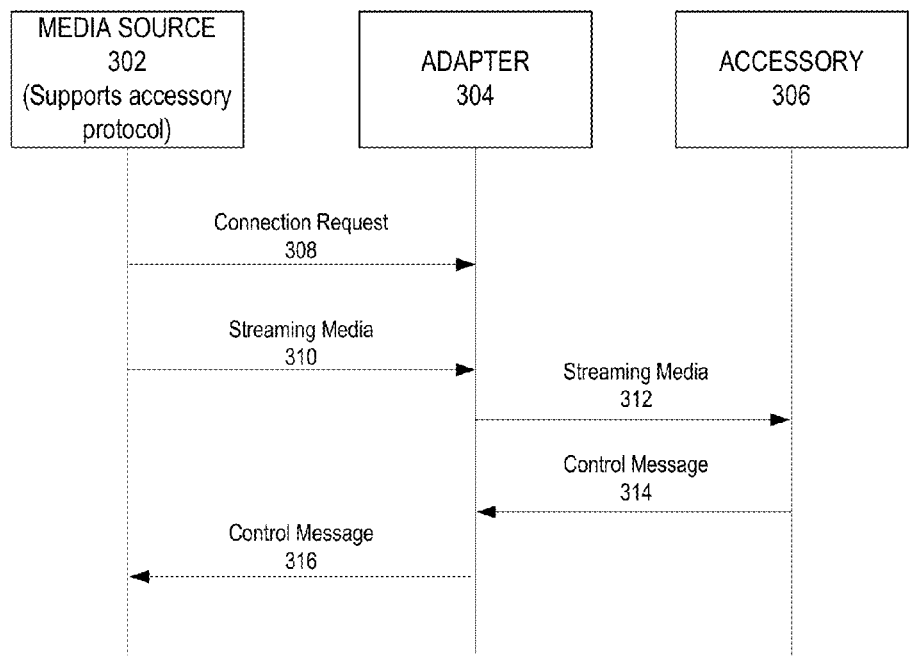
FIGS. 3A-3B are sequence diagrams illustrating communications between an accessory, an adapter, and a media source according to an embodiment of the present invention.

FIG. 3A is a sequence diagram showing illustrative communications between a media source 302, an adapter 304 and an accessory 306, according to an embodiment of the present invention. Media source 302, adapter 304 and accessory 306 can be, e.g., devices 202, 204 and 206, respectively, as described with reference to FIG. 2. Media source 302 supports an accessory protocol that is also supported by accessory 306.

Connection request 308 can be transmitted from media source 302 to adapter 304. The connection request can be generated according to, for example, a wireless streaming protocol. In some embodiments, in response to receiving the connection request, adapter 204 sends an acknowledgement of the connection request (not shown) to media source 302. Adapter 304 may perform an authentication of the media source prior to sending an acknowledgement of the connection request. Alternatively, adapter 304 may send the connection request to accessory 206, which may perform an authentication of the media source and transmit an indication of the authentication result to adapter 204.

Media source 302 transmits streaming media to adapter 304, as indicated at 310. The streaming media can be transmitted using, for example, a wireless streaming protocol. The adapter transmits the streaming media to accessory 306, as indicated at 312.

A control message may be transmitted from accessory 306 to adapter 304, as indicated at 314. For example, accessory 306 may generate a control message in response to receiving user input at controls 108 of accessory 106, shown in FIG. 1. The control message can be generated according to, for example, an accessory protocol. Because media source 302 supports the accessory protocol, the control message is transmitted from adapter 304 to media source 302 using the accessory protocol, as indicated at 316.

Figure 3B:
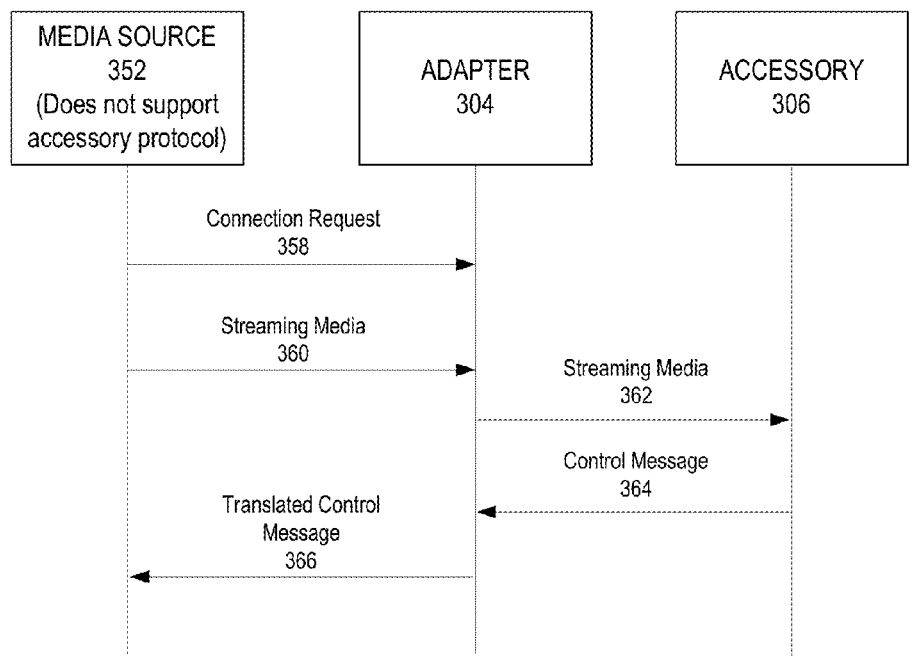

FIG. 3B is a sequence diagram that is similar to the sequence diagram of FIG. 3A, except that media source 352 does not support an accessory protocol that is supported by accessory 306. Media source 352, adapter 304 and accessory 306 can be, e.g., devices 202, 204 and 206, respectively, as described with reference to FIG. 2.

Connection request 358 can be transmitted from media source 352 to adapter 354. After the adapter receives connection request 358, media source 352 transmits streaming media to adapter 354, as indicated at 360. Adapter 354 transmits the streaming media to accessory 356, as indicated at 362.

A control message may be transmitted from accessory 356 to adapter 354 as indicated at 364. The control message can be generated according to an accessory protocol. Because media source 352 does not support the accessory protocol, the control message is translated from the accessory protocol to a wireless streaming protocol that is supported by media source 352. The translated message is transmitted from adapter 354 to media source 352 using the wireless streaming protocol, as indicated at 366.

Figure 4A:
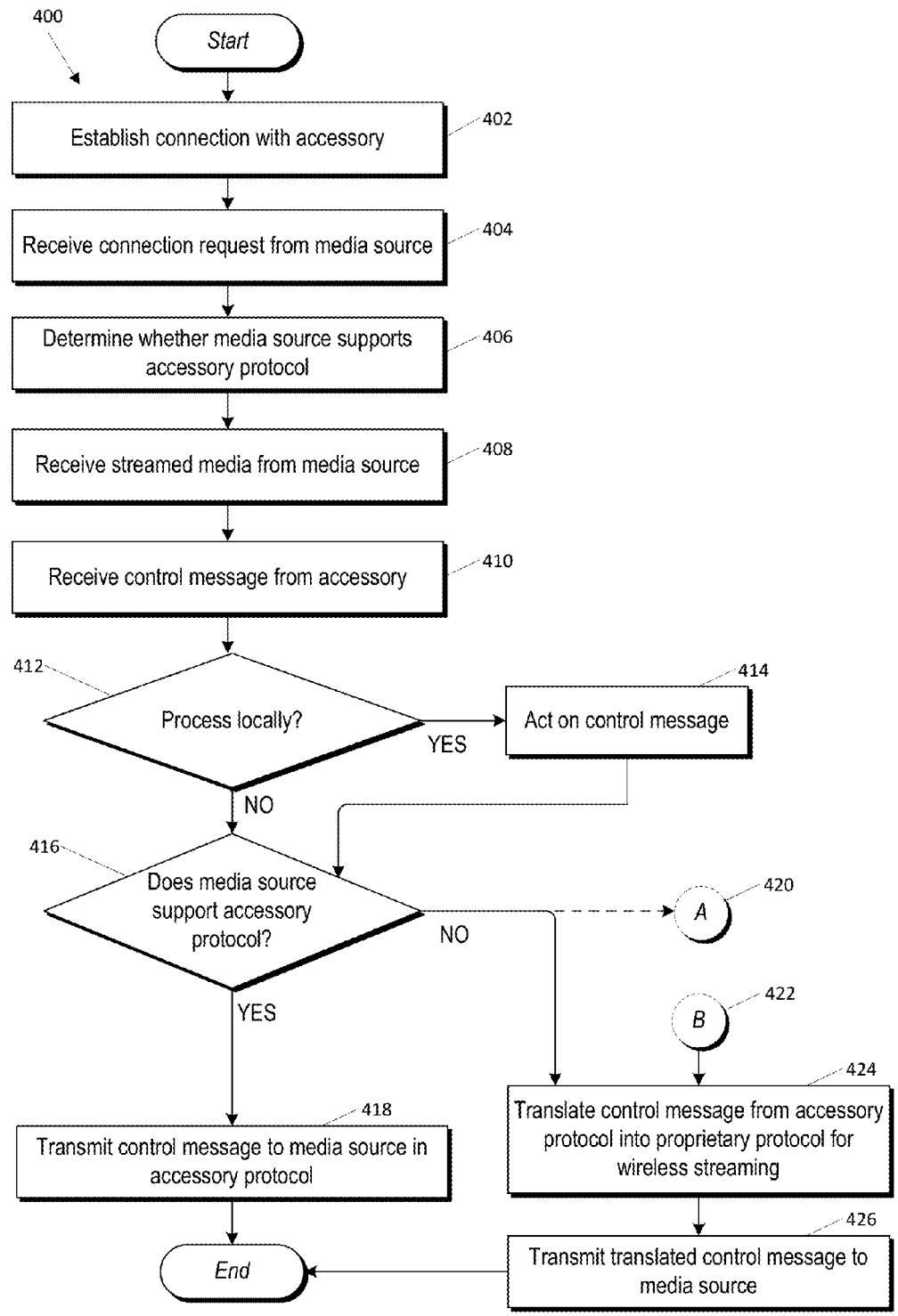
FIG. 4A is a flow diagram of a process for establishing a connection between an accessory and a media source via an adapter according to an embodiment of the present invention.
Figure 4B:
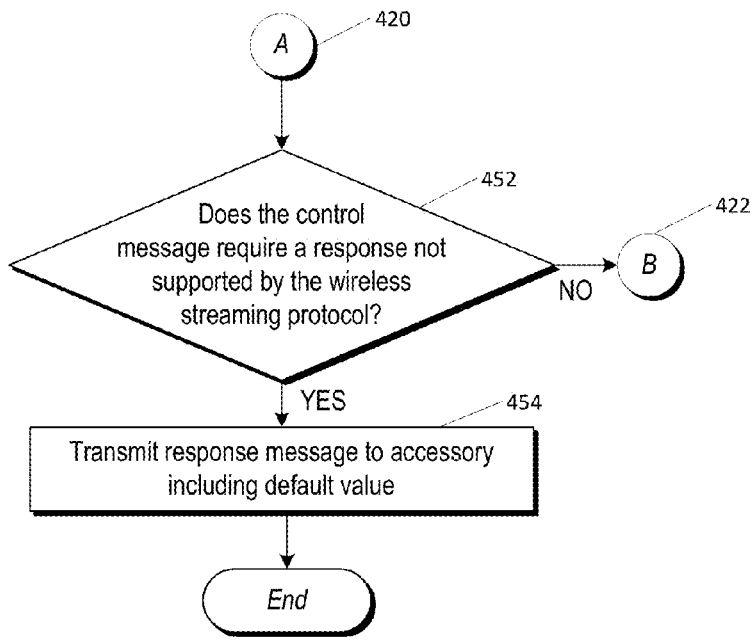
FIG. 4B is a flow diagram of a process for responding to a control message that includes a database query according to an embodiment of the present invention.

The sequences illustrated in FIG. 3A and FIG. 3B can be implemented as indicated in the flow diagram of FIGS. 4A and 4B, which illustrate a process 400 for establishing a connection between an accessory and a media source via an adapter according to an embodiment of the present invention.

Referring to FIG. 4A, at block 402, adapter 204 establishes a connection with accessory 206. For example, a connector of adapter 204 may be coupled to a connector of accessory 206 such that physical contact is established between the contacts of the respective connectors. Establishing a connection can involve communications between adapter 204 and accessory 206. For example, adapter 204 can receive accessory protocol messages that identify the accessory and indicate its capabilities, e.g., whether the accessory supports analog audio, whether the accessory supports digital audio, video formats supported by the accessory, etc. Adapter 204 can emulate a media source device so that accessory 206 cannot determine whether it is connected directly to a media source or connected through the adapter.

At block 404, adapter 204 receives a connection request from media source 202. The connection request can involve conventional device discovery techniques. For example, adapter 204 can send a beacon signal to indicate that it is present and capable of receiving streamed media. In another example of a connection request, adapter 204 can receive and respond to a beacon signal from media source 202. Based on the contents of the connection request, the adapter determines whether media source 202 supports the accessory protocol.

The connection request signal can include information elements indicating capabilities of the media source. For example, one or more information elements can indicate that the source supports the accessory protocol. The presence or absence of an information element indicating support of an accessory protocol can be used by adapter 204 to determine whether media source 202 supports an accessory protocol, as indicated at block 406. It will be understood that the determination of whether the media source supports an accessory protocol can be made on the basis of other information provided from media source 202 to adapter 204, such as a header attached to media streamed from the media source to the adapter. Also, it will be understood that adapter 204 may determine whether media source 202 supports an accessory protocol at any point prior to transmitting information associated with a control message received from accessory 206 to media source 202.

At block 408, adapter 204 can receive streamed media from media source 202 and deliver the streamed media to accessory 206. Adapter 204 can receive a control message from accessory 206, as indicated at block 410. The control message is transmitted from accessory 206 to adapter 204 according to the accessory protocol.

Accessory 206 can send a message that adapter 204 can act on locally, for example, a command message selecting analog audio, a command message selecting digital audio, a command message to switch from analog audio to digital audio, a command message to switch from digital audio to analog audio, and a volume control command message. In some embodiments, a volume control command message can be controlled by gain on an analog audio line of accessory 206. At decision block 412, adapter 204 determines whether the control message can be processed locally by the adapter. If so, the adapter acts on the control message, as indicated at block 414.

If adapter 204 determines that the control message cannot be processed locally by the adapter, the adapter determines how to transmit the control message to media source 202. At decision block 416, adapter 204 determines whether translation of the control message is required based on the determination of whether media source 202 supports the accessory protocol (as described with reference to block 406). If the media source supports the accessory protocol, adapter 204 transmits the control message to media source 202 using the accessory protocol, as indicated at block 418. In some embodiments, if the media source does not support the accessory protocol, flow may proceed according to optional features A-B, as indicated at 420-422 and described further with reference to FIG. 4B. Otherwise, if the media source does not support the accessory protocol, adapter 204 can translate the control message into the wireless streaming protocol, as indicated at block 424. For example, a protocol translation module 226 embodied within adapter circuitry 222 of adapter 204 may translate the control message from the accessory protocol to the wireless streaming protocol. The translated control message is transmitted from adapter 204 to media source 202 using the wireless streaming protocol, as indicated at block 426.

Some control messages generated according to an accessory protocol may include a request that is not supported by the wireless streaming protocol. For example, a control message may include a request for data or for a function that is not supported by the wireless streaming protocol. In one embodiment, a control message generated according to an accessory protocol can include a database query. An example of a database query can be, for example, a request for a track title or album art associated with a media file. If a media source does not support the accessory protocol and the wireless streaming protocol does not support a particular control message generated according to the accessory protocol, such as a control message including a database query, the adapter may be unable to translate the control message from the accessory protocol to the wireless streaming protocol.

In some embodiments, when adapter 204 receives a control message from accessory 206 and the control message is not supported by the wireless streaming protocol, adapter 204 can generate a response message to transmit to accessory 206. For example, when accessory 206 transmits a control message including a database query to adapter 204, adapter 204 may transmit a response message including default message to accessory 206. In an illustrative example, accessory 206 transmits a control message including a request for album art. Adapter 204 receives the control message and can transmit a response including a default value, such as "feature not supported." Adapter 204 may include a database or other stored data to mimic the database located on a portable media device. The database may be embodied within adapter circuitry 222 of adapter 204. The default value can be located on the database of adapter 204. In this manner, accessory 206 communicates with adapter 204 using the accessory protocol as if the accessory were communicating with a portable media device having a database.

Figure 5:
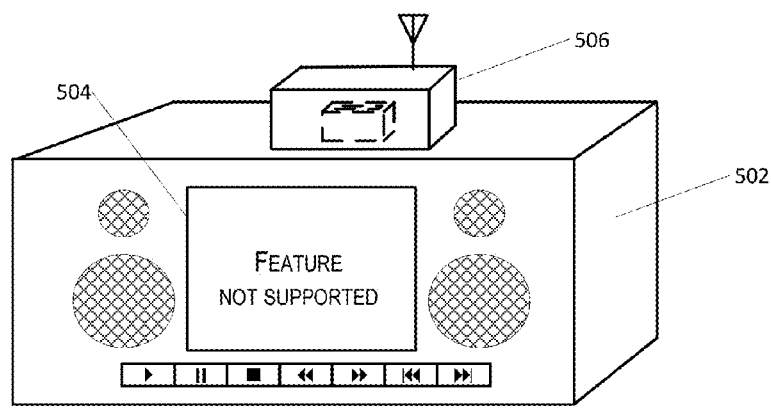
FIG. 5 illustrates an accessory displaying a default value received in a response message according to an embodiment of the present invention.

FIG. 4B indicates operations that may occur if the media source does not support the accessory protocol. FIG. 4A may optionally proceed to node A, as indicated at 420. At decision block 452, adapter 204 can determine whether a control message received from accessory 206 requires a response not supported by wireless streaming protocol. For example, a control message may be a database query and the wireless streaming protocol may not support database queries. If the control message requires a response not supported by the wireless streaming protocol, adapter 204 can transmit a response message including a default value to accessory 206, as indicated in block 454. In some instances, the default value can be a message that informs the user that the functionality requested is not available. The accessory can display the default value as if the accessory had received the requested data. FIG. 5 shows an accessory 502 displaying on display 504 a default value as received in a response message from adapter 506.

If the control message does not include a database query, flow returns to process as described with reference to FIG. 4A at point B, indicated at 418.

Although process 400 is shown as ending after a message is transmitted, it is to be understood that the process can continue indefinitely, for as long as adapter 204 remains connected to both accessory 206 and media source 202.

Figure 6:
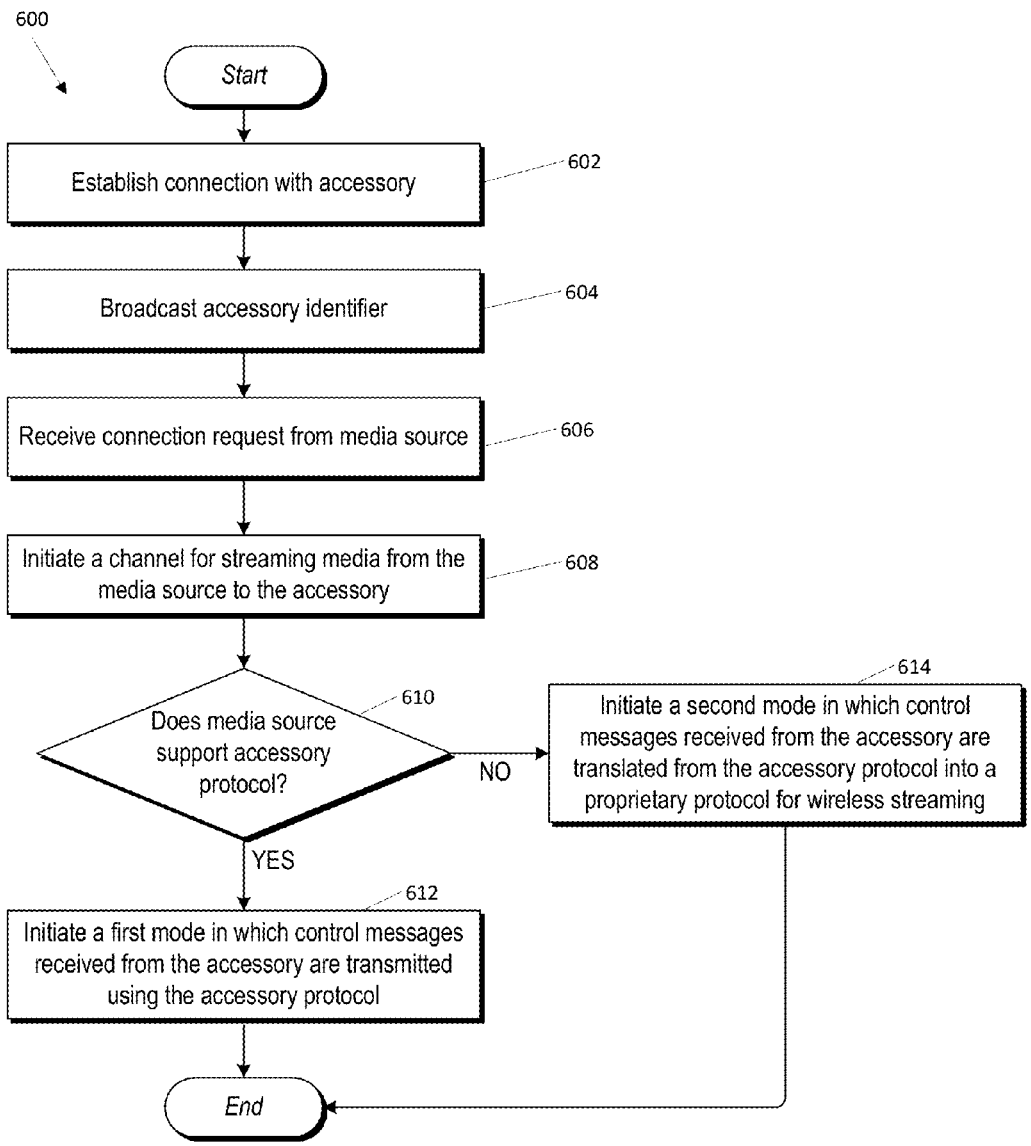
FIG. 6 is a flow diagram of a process for establishing a connection between an accessory and a media source via an adapter including broadcasting an accessory identifier according to an embodiment of the present invention.

In some embodiments, when adapter 204 is connected to accessory 206, adapter 204 broadcasts the presence of accessory 206 using a wireless channel. For example, adapter 204 may broadcast a signal including an identifier associated with accessory 206. This signal may be detected by media source 202. In response to detecting the signal, media source 202 may send a connection request to adapter 204 and a connection between the adapter and the media source may be established. In this manner, a connection is established between media source 202 and accessory 206 via adapter 204, with no configuration beyond selection of accessory 204 at media source 206 required. Media source 202 becomes connected to accessory 206 via adapter 204 without needing to join a network, such as a wireless network. FIG. 6 illustrates a process 600 for establishing a connection between an accessory and a media source via an adapter including broadcasting an accessory identifier.

At block 602, a connection is established between adapter 204 and accessory 206. Adapter 204 broadcasts a signal including an identifier associated with accessory 206, as indicated at block 604. The identifier may include identifying information such as one or more of a brand name, a device type, and so on. The signal may be broadcast via Wi-Fi, Bluetooth, or another wireless protocol. In some embodiments, power is provided to adapter 204 by accessory 206 and adapter 204 may broadcast a signal including an identifier when receiving power from accessory 206. Media source 202 may detect the signal broadcast by adapter 204.

At block 606, adapter 204 receives a connection request from media source 206. Adapter 204 initiates a channel for streaming media from the media source to the accessory, as indicated at block 608. At decision block 610, adapter 204 determines whether media source 202 supports an accessory protocol. The adapter may determine whether media source 202 supports the accessory protocol based on one or more information elements of the connection request. If media source 202 supports the accessory protocol, adapter 204 initiates a first mode in which control messages received from the accessory are transmitted from adapter 204 to media source 206 using the accessory protocol, as indicated at block 612. If media source 202 does not support the accessory protocol, adapter 204 initiates a second mode in which control messages received from accessory 206 are translated from an accessory protocol into a wireless streaming protocol, as indicated at block 614.

Figure 7:
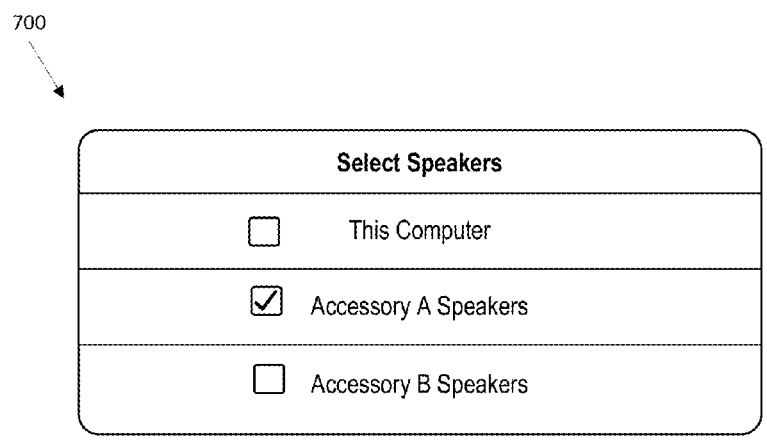
FIG. 7 is an illustrative route picker interface according to an embodiment of the present invention.

In some embodiments, when adapter 204 broadcasts an identifier associated with accessory 206, as described with reference to FIG. 6, the identifier is displayed in a route picker interface on a display of media source 202. The route picker shows one or more devices with which media source 202 can communicate using a wireless streaming protocol. An illustrative route picker interface 700 is shown in FIG. 7. A user can select a device shown in route picker interface 700. When the user selects a device, the selected device can receive streamed media from media source 202 e.g., via adapter 204. For example, when accessory 206 is connected to adapter 204, adapter 204 may broadcast an identifier that identifies accessory 206, such as "Accessory A Speakers." When "Accessory A Speakers" is selected from route picker interface 700, media source 202 can send a connection request to adapter 204. When adapter 204 receives the connection request from media source 202, accessory 206 can receive streaming media from media source 202 via adapter 204. In this manner, the user may select a desired destination for streaming media without needing to have any knowledge about the streaming protocol used by a media source. The user simply selects a destination and the adapter determines which protocol to use.

The adapter described herein allows streaming media to be transmitted from a media source to an accessory when the media source does not have a connector that is compatible with the accessory. The adapter can transmit streaming media from the media source to the accessory and also allows the media source to be controlled using the accessory, even if the media source does not support an accessory protocol used by the accessory.

Embodiments described herein relate to an adapter to provide connectivity between an accessory and a media source. The adapter can have a connector formatted to mate with a connector of the accessory. Communication between the accessory and the adapter can take place via electrical connectors of the adapter connector and the accessory connector. The adapter can communicate wirelessly with a media source. When the media source is connected to the adapter, the media source can send streaming media to the accessory via the adapter using a wireless streaming protocol. The accessory may generate a control message using an accessory protocol. The adapter can determine if the media source supports the accessory protocol. If the media source supports the accessory protocol, the adapter sends the control message to the media source without translating the message. If the media source does not support the accessory protocol, the adapter translates the control message before sending it to the media source.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method for establishing a connection between an accessory and a media source via an adapter, the method comprising, by the adapter:
   establishing a connection with the accessory;
   receiving a connection request from the media source;
   determining whether the media source supports an accessory protocol based on one or more information elements of the connection request;
   receiving streamed media content from the media source according to a wireless streaming protocol and delivering the streamed media content to the accessory;
   receiving a control message from the accessory according to the accessory protocol;
   if the media source supports the accessory protocol, transmitting the control message from the accessory to the media source using the accessory protocol; and
   if the media source does not support the accessory protocol:

translating the control message into the wireless streaming protocol, and transmitting the translated control message to the media source.

2. The method of claim 1, further comprising, if the control message requires a response not supported by the wireless streaming protocol, transmitting a response message to the media source including a default value.

3. The method of claim 2, wherein the control message is a database query and the default value is determined within the adapter.

4. The method of claim 1, wherein establishing the connection with the accessory does not require that the media source join the network of the accessory.

5. The method of claim 1, wherein prior to establishing the connection with the accessory, the adapter broadcasts presence of the accessory to the media source via a wireless channel.

6. The method of claim 5, wherein the wireless channel is a Wi-Fi channel.

7. The method of claim 1, further comprising determining a routing mode based on the control message.

8. The method of claim 7, wherein the routing mode is determined from a group including USB host mode, USB device mode, and audio line-out mode.

9. The method of claim 1, further comprising determining, by the adapter, whether the adapter is capable of processing the control message.

10. The method of claim 9, wherein if the adapter is capable of processing the control message, the adapter acts on the control message.

11. A method for establishing a connection between an accessory and a media source via an adapter, the method comprising, by the adapter:
broadcasting the presence of the accessory to the media source via a wireless channel;
receiving a connection request from the media source;
initiating a channel for streaming media from the media source to the accessory;
determining whether the media source supports an accessory protocol based on one or more information elements of the connection request;
if the media source supports the accessory protocol, initiating a first operating mode in which control messages received from the accessory using the accessory protocol are transmitted to the media source using the accessory protocol; and
if the media source does not support the accessory protocol, initiating a second operating mode in which:
control messages from the accessory are translated from the accessory protocol into a wireless streaming protocol, and
translated control messages are transmitted to the media source.

12. The method of claim 11, wherein the wireless channel is a Wi-Fi channel.

13. The method of claim 11, wherein prior to initiating a channel for streaming media, the adapter performs an authentication of the media source.

14. The method of claim 11, wherein the media source is a portable media device.

15. The method of claim 11, wherein the media source is a computing device.

16. The method of claim 11, wherein the accessory includes a speaker.

17. The method of claim 11, wherein the operation in the second operating mode further comprises determining whether the wireless streaming protocol supports a particular received control message, wherein if the wireless streaming protocol does not support the particular received control message, the adapter transmits a response message to the accessory including a default value.

18. The method of claim 17, wherein the control message is a database query and the default value is determined within the adapter.

19. The method of claim 11 further comprising determining a routing mode based on a control message received from the accessory.

20. The method of claim 19, wherein the routing mode is selected from a group including a USB host mode, a USB device mode, and an audio line-out mode.

21. An adapter for connecting an accessory with a media source, the adapter comprising:
a first communication interface adapted to the accessory;
a second communication interface adapted to receive streamed media from the media source using a wireless streaming protocol;
adapter circuitry adapted to deliver the streamed media received from the first communication interface to the second communication interface; and
a protocol translation module adapted to:
receive a control message from the accessory;
determine whether the media source supports an accessory protocol based on one or more information elements of a connection request,
if the media source supports the accessory protocol, to transmit the received control message to the media source using the accessory protocol, and
if the media source does not support the accessory protocol, to translate the received control message into the wireless streaming protocol and transmit the translated control message to the media source.

22. The adapter of claim 21, wherein the first communication interface includes an electrical connector.

23. The adapter of claim 21, wherein the second communication interface includes a wireless interface.

24. The adapter of claim 21, wherein the adapter receives power from the accessory.

* * * * *